Aug. 10, 1926.  
R. B. FAGEOL  
1,595,390  
COMBINED FENDER GUARD AND BUMPER  
Filed Feb. 18, 1925
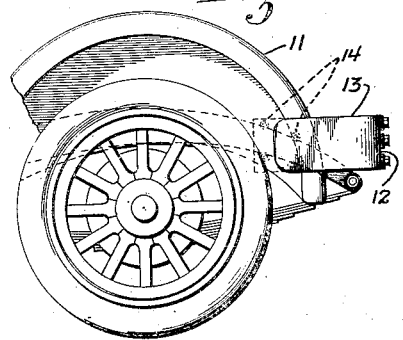
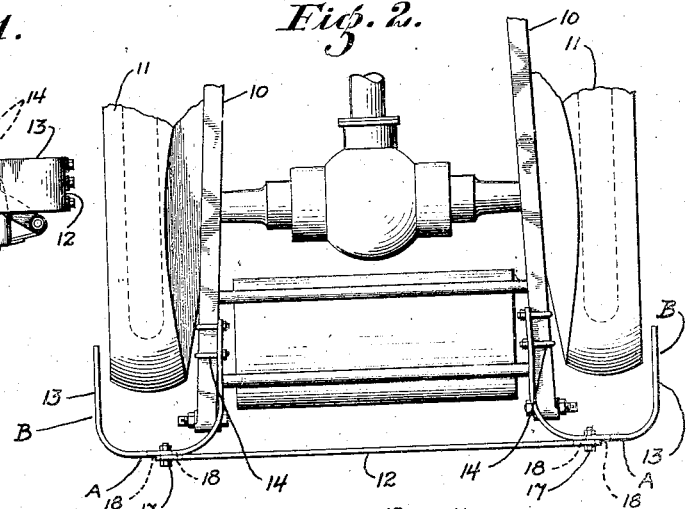
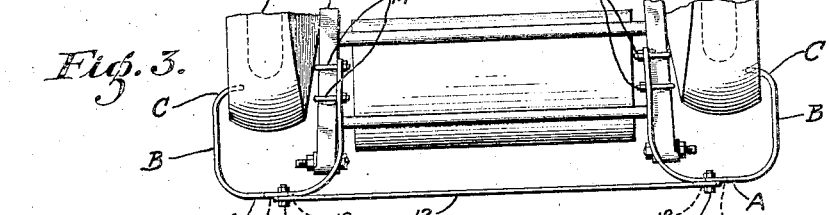
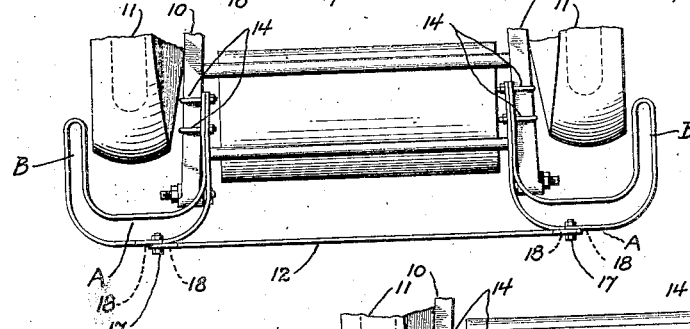
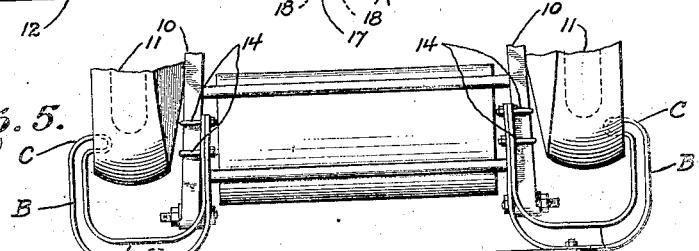
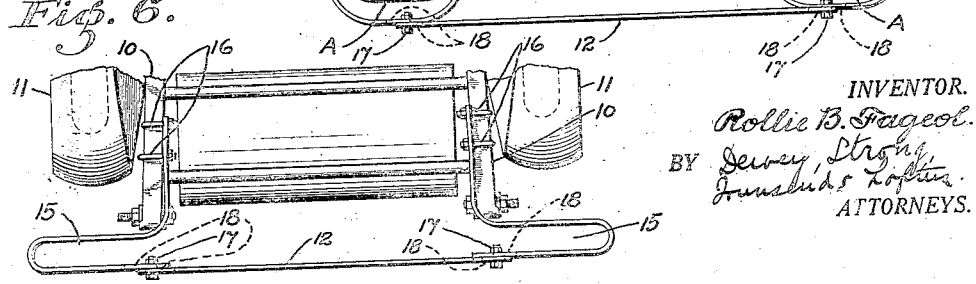
INVENTOR.  
Rollie B. Fageol.  
BY
ATTORNEYS.

Patented Aug. 10, 1926.

1,595,390

UNITED STATES PATENT OFFICE.

ROLLIE B. FAGEOL, OF LOS ANGELES, CALIFORNIA, ASSIGNOR TO AMERICAN CHAIN COMPANY, INC., OF BRIDGEPORT, CONNECTICUT, A CORPORATION OF NEW YORK.

COMBINED FENDER GUARD AND BUMPER.

Application filed February 18, 1925. Serial No. 9,973.

This invention relates to a protecting device for automobiles and particularly pertains to means for protecting the end of the automobile and for guarding the fenders.

At the present time it is common practice to fit the ends of automobiles with means for protecting the automobile frame from the damaging effect of collision and particularly protecting the radiator at the front of the frame or the gasoline tank at the rear thereof. It is also desirable to provide means for protecting the wheel fenders, and in most instances in the past this has been done by causing the ends of a bumper to overhang the sides of the automobile frame, and in that manner tend to protect the fenders from blows delivered substantially parallel to the length of the vehicle.

It is the principal object of the present invention therefore, to provide means which will produce additional protection for the ends of the automobile, as well as the sides and ends of the fenders, all of which is embodied in a structure decidedly simple as to design and with special advantages as to the manner in which the structure may be fastened to the frame members of various makes of automobiles.

The present invention contemplates the use of a pair of separate fender guards formed from material of a width greater than the width of the portion of the frame onto which the guards are mounted, whereby the guards may be applied without special formation for the various cars upon which the bumper is to be mounted, said guards carrying transversely and horizontally extending impact bars adjustably secured to the outer faces of the fender guards in a manner to combine with said guards and thus afford a complete protecting structure extending across the rear or front of an automobile, and including means for adequately protecting the automobile fenders from thrusts delivered lengthwise of the automobile, from the sides, and obliquely from the ends opposite to which the fenders are mounted.

The invention is illustrated by way of example in the accompanying drawings, in which:

Fig. 1 is a fragmentary view in side elevation showing one form of the invention mounted at the rear of an automobile.

Fig. 2 is a fragmentary view in plan showing a simple form of the present invention, as applied to the rear of an automobile.

Fig. 3 is a fragmentary view in plan showing a modification of the invention, whereby additional protection for the fenders is obtained.

Fig. 4 is a fragmentary view in plan showing a form of the invention in which the ends or guard sections are looped.

Fig. 5 is a fragmentary view in plan showing a form of the looped guard sections of the general design as disclosed in Fig. 3.

Fig. 6 is a view in plan showing another form of the present invention, the guard members of which are in the shape of open loops.

Referring more particularly to the accompanying drawings, 10 indicates the side frame members of an automobile main frame, and while in the drawings of the present specification the rear portion of an automobile frame is disclosed, it is to be understood that the present invention is applicable equally to the front and rear ends of an automobile. In the case of the rear of the automobile, however, fenders 11 carried by the frame terminate at a lower level relative to the frame than do the terminating ends of front fenders, thus requiring adequate protection.

As shown in the drawings, the bumper with which the present invention is concerned, comprises a horizontally extending impact section 12 connecting and being supported by fender guard units 13 at the opposite ends thereof. The fender guard units in the various figures of the drawings are of different formations, although they are made from substantially the same width stock. That is to say, the thickness of the bar or plate from which the fender guards are made is, for example, three-eighths of an inch thick, while the width or vertical dimension of the stock is possibly four inches, as clearly indicated in Fig. 1 of the drawings. Due to this, it is possible to utilize simple fastening means, such as U-bolts 14 by which the fender guards may be securely held in position against the sides of the frame member 10 without the necessity of specially forming the connecting ends of the guards to accommodate variations in design occurring in the different makes of cars now on the market.

The fender guards are made of a single member as shown in Figs. 2, 3 and 6, or may be made of double members to form the loop sections shown in Figs. 4 and 5. In either event the stock selected is substantially the same, and the variation will be merely one of strength and resiliency.

In the form of the invention shown in Fig. 3 and Fig. 5, the fender guards have horizontally extending sections A which are supported transversely of the automobile frame and overhang the sides of the frame members 10 in a manner to protect the fenders 11. These guards also are formed with sections B which extend substantially parallel to the frame and along the outer sides of the fenders. In these particular forms of the invention the ends of the fender guards terminate in inturned hook sections C, which hook around the curled edge of the fenders and provide means for protecting the fenders against obliquely delivered impact blows tending to strike the curled portion of the fenders and to tear them off.

In the forms of the invention shown in Figs. 1 and 4, the inturned hooked sections C are eliminated and the fender guards merely comprise overhanging sections A and the outer guard sections B, which will protect the ends and sides of the fenders from collision.

In the form of the invention shown in Fig. 6, the fender guards comprise an open loop 15, one end of which extends parallel to the frame and is connected thereon by suitable fastenings, such as U-bolts 16. The outer ends of the loops extend horizontally in longitudinal alignment and receive the horizontal bumper bars 12. It is to be understood that in connection with any of the forms of the invention shown in the drawing, the fender guards may be secured together by one or more of the impact bars 12, and it will be apparent that due to the width of the stock from which the fender guards are made, a plurality of parallel impact bars may be used as indicated in Fig. 1 of the drawings. It will also be apparent that the connecting bolts 17 which secure the ends of the impact bars 12 to the fender guards may pass through slotted openings 18 in the fender guards, so that the present invention may be readily adjusted and applied to automobiles varying in frame widths.

While I have shown the preferred form of my invention as now known to me, it is to be understood that various changes may be made in its construction without departing from the spirit of the invention as defined in the appended claims.

Having thus described my invention, what I claim and desire to secure by Letters Patent is:

1. A device of the character described comprising a horizontally disposed bumper bar extending transversely of the end of an automobile, fender guards forming continuations of said bumper bar at its opposite ends and overhanging the fenders of the automobile and terminating in free end portions extending along the outer faces of the automobile fenders, and means for rigidly fastening said structure onto the frame of an automobile.

2. A device of the character described comprising a horizontally disposed bumper bar extending transversely of the end of an automobile, fender guards forming continuations of said bumper bar at its opposite ends and overhanging the fenders of the automobile and terminating in portions extending along the outer faces of the automobile fenders, said portions terminating in curved ends hooking around the edges of said fenders, and means for mounting said structure on the frame of an automobile.

3. In combination with an automobile and a pair of fenders carried along the opposite sides thereof, fender guards each made of stock having a greater vertical width than the vertical thickness of the portion of the automobile frame onto which said guards are mounted, each guard being formed with a fastening arm adapted to be secured to the side of the frame, overhanging end portions substantially at right angles thereto, guard portions substantially parallel to the mounting portions and extending along the opposite sides of the fenders, and a horizontally disposed impact bar connecting said guards.

4. In combination with an automobile frame and a pair of fenders secured along opposite sides thereof, a pair of fender guards having mounting arms adapted to lie against the sides of the frame members, outwardly turned portions overhanging the frame and fenders, said guard members being formed of material having a greater vertical width than that of the frame members upon which they are mounted, and impact members horizontally connecting the two guards.

5. In combination with an automobile frame and a pair of fenders secured along opposite sides thereof, a pair of fender guards having mounting arms adapted to lie against the sides of the frame members, outwardly turned portions overhanging the frame and fenders, which portions are bent to form side guard sections for the fenders, said guard members being formed of material having a greater vertical width than that of the frame members upon which they are mounted, and impact members horizontally connecting the two guards.

6. In combination with an automobile frame and a pair of fenders secured along opposite sides thereof, a pair of fender guards having mounting arms adapted to lie against the sides of the frame members, outwardly turned portions overhanging the frame and fenders, which portions are bent to form side guard sections for the fenders, and are hooked at their ends to curve around the flange of the fenders, said guard members being formed of material having a greater vertical width than that of the frame members upon which they are mounted, and impact members horizontally connecting the two guards.

7. In combination with an automobile frame and a pair of fenders secured along opposite sides thereof, a pair of fender guards having mounting arms adapted to lie against the sides of the frame members, outwardly turned portions overhanging the frame and fenders, said guard members being hooked and formed of material having a greater vertical width than that of the frame members upon which they are mounted, and impact members horizontally connecting the two guards.

8. In combination with an automobile frame and a pair of fenders secured along opposite sides thereof, a pair of fender guards having mounting arms adapted to lie against the sides of the frame members, outwardly turned portions overhanging the frame and fenders, which portions are bent to form side guard sections for the fenders, said guard members being hooked and formed of material having a greater vertical width than that of the frame members upon which they are mounted, and impact members horizontally connecting the two guards.

9. In combination with an automobile frame and a pair of fenders secured along opposite sides thereof, a pair of fender guards having mounting arms adapted to lie against the sides of the frame members, outwardly turned portions overhanging the frame and fenders, which portions are bent to form side guard sections for the fenders, and are hooked at their ends to curve around the flange of the fenders, said guard members being formed of material having a greater vertical width than that of the frame members upon which they are mounted, and impact members horizontally connecting the two guards.

ROLLIE B. FAGEOL.